(12) United States Patent
Madge

(10) Patent No.: US 10,364,753 B2
(45) Date of Patent: Jul. 30, 2019

(54) GEARED GAS TURBINE ENGINE AND A GEARBOX

(71) Applicant: ROLLS-ROYCE PLC, London (GB)

(72) Inventor: Jason J Madge, Dursley (GB)

(73) Assignee: ROLLS-ROYCE plc, London (GB)

( * ) Notice: Subject to any disclaimer, the term of this patent is extended or adjusted under 35 U.S.C. 154(b) by 49 days.

(21) Appl. No.: 15/628,767

(22) Filed: Jun. 21, 2017

(65) Prior Publication Data

US 2018/0010525 A1    Jan. 11, 2018

(30) Foreign Application Priority Data

Jul. 8, 2016 (GB) .................................. 1611893.7

(51) Int. Cl.
*F02C 7/36* (2006.01)
*F02C 7/32* (2006.01)
(Continued)

(52) U.S. Cl.
CPC .................. *F02C 7/36* (2013.01); *F02C 7/32* (2013.01); *F16H 1/02* (2013.01); *F16H 57/082* (2013.01);
(Continued)

(58) Field of Classification Search
CPC .......... Y02E 10/722; F03D 15/00; F02C 7/36; F16H 57/082; F16H 1/02;
(Continued)

(56) References Cited

U.S. PATENT DOCUMENTS

| 3,939,736 A | 2/1976 | Morin |
| 4,838,123 A | 6/1989 | Matoba |

(Continued)

FOREIGN PATENT DOCUMENTS

| DE | 2228024 A1 | 1/1974 |
| DE | 19711423 C1 | 9/1998 |

(Continued)

OTHER PUBLICATIONS

Dec. 28, 2016 Search Report issued in Great Britain Patent Application No. GB1611893.7.

(Continued)

*Primary Examiner* — Roger L Pang
(74) *Attorney, Agent, or Firm* — Oliff PLC

(57) ABSTRACT

A gas turbine engine comprises a gearbox comprising a sun gear, an annulus gear, a plurality of planet gears and a carrier. The carrier comprises a primary structure and at least one reinforcing structure. The primary structure comprises a first material and the at least one reinforcing structure comprises a second material. The primary structure includes a first ring, a second ring spaced axially from the first ring and a plurality of circumferentially spaced axles extending axially between the first ring and the second ring. Each planet gear is rotatably mounted on a respective one of the axles by a bearing. The reinforcing structure is secured to the primary structure and the reinforcing structure comprises a particulate reinforced material or a fiber reinforced material. The reinforcing structure increases the stiffness of the carrier and reduces the weight of the carrier.

12 Claims, 5 Drawing Sheets

(51) Int. Cl.
 *F16H 1/02* (2006.01)
 *F16H 57/08* (2006.01)
 *B64D 35/00* (2006.01)

(52) U.S. Cl.
 CPC .... *B64D 35/00* (2013.01); *F05D 2260/40311* (2013.01); *F05D 2260/53* (2013.01); *F05D 2300/603* (2013.01); *F05D 2300/6032* (2013.01); *F05D 2300/6033* (2013.01); *F05D 2300/614* (2013.01); *F05D 2300/702* (2013.01); *Y02T 50/672* (2013.01)

(58) Field of Classification Search
 CPC ... F05D 2300/6033; F05D 2260/40311; F05D 2260/53; F05D 2300/603; F05D 2300/611; F05D 2300/6032; F05D 2300/702; Y02T 50/672
 USPC .......................................................... 475/331
 See application file for complete search history.

(56) References Cited

U.S. PATENT DOCUMENTS

| | | | |
|---|---|---|---|
| 5,171,195 A | 12/1992 | Funamoto | |
| 6,964,155 B2* | 11/2005 | McCune | F02C 7/36 384/297 |
| 7,883,439 B2* | 2/2011 | Sheridan | F01D 25/18 475/159 |
| 8,267,826 B2* | 9/2012 | Duong | F16H 57/042 475/159 |
| 9,062,756 B2 | 6/2015 | Hagedorn | |
| 9,169,917 B2* | 10/2015 | Biermann | F16H 57/082 |
| 2003/0232694 A1 | 12/2003 | Buhrke | |
| 2014/0106926 A1 | 4/2014 | Hagedorn | |
| 2016/0003344 A1 | 1/2016 | Mapkar et al. | |
| 2016/0146112 A1 | 5/2016 | Van der Merwe et al. | |
| 2018/0016938 A1* | 1/2018 | Doorbar | F01D 5/06 |

FOREIGN PATENT DOCUMENTS

| | | |
|---|---|---|
| DE | 19909191 A1 | 9/2000 |
| DE | 10 2011 102731 A1 | 11/2012 |
| DE | 102011083604 A1 | 3/2013 |
| EP | 2963313 A1 | 1/2016 |
| FR | 2 247 930 A5 | 5/1975 |
| JP | S55-163352 A | 12/1980 |

OTHER PUBLICATIONS

Nov. 6, 2017 Search Report issued in European Patent Application No. 17 17 7060.

\* cited by examiner

GEARED GAS TURBINE ENGINE AND A GEARBOX

The present disclosure concerns a geared gas turbine engine and in particular to a geared turbofan gas turbine engine or a geared turbo propeller gas turbine engine.

A geared turbofan gas turbine engine or a geared turbo propeller gas turbine engine comprises a gearbox which is arranged to drive the fan or propeller. The gearbox allows the fan, or the propeller, to rotate at a speed less than the speed the speed of rotation of a turbine driving the gearbox. This enables the efficiency of the fan, or the propeller, and the efficiency of the turbine to be improved.

In one arrangement the gearbox comprises a sun gear which is arranged to be driven by a turbine, an annulus gear which is arranged to be static, planet gears meshing with the sun gear and the annulus gear and a carrier which is arranged to drive the fan, or the propeller, if the gearbox is a planetary gearbox. In another arrangement the gearbox comprises a sun gear which is arranged to be driven by a turbine, an annulus gear which is arranged to drive the fan, or the propeller, planet gears meshing with the sun gear and the annulus gear and a carrier which is arranged to be static if the gearbox is a star gearbox. In a further arrangement the gearbox comprises a sun gear which is arranged to be driven by a turbine, an annulus gear which is arranged to drive a first fan, or a first propeller, planet gears meshing with the sun gear and the annulus gear and a carrier which is arranged to drive a second fan, or a second propeller, if the gearbox is a differential gearbox.

In large, high speed, gearboxes the gearbox must endure very high loads due to centrifugal loading from the rotating planet gears and the basic torque load which the gearbox is arranged to transmit. The carrier of the gearbox is required to support the loads applied to the planet gears and planet gear bearings, which may be generated by torque or centrifugally generated. The carrier must also maintain the positions of the gears very accurately to maintain adequate gear performance in terms of controlling the tooth loading and the noise, or vibration, levels.

The carrier comprises one or more disc like structures, or ring structures, which are arranged to transmit both the torsional load and the radial load and control deflections of the carrier within the limits required for the gearbox. Torsional loads may produce torsional displacements of the gears which may result in improved load sharing between the gears. However, radial loads may produce radial displacements of the planet gears relative to the sun and annulus gears which may result in transmission errors and hence noise and vibration and tooth overloading.

In order to overcome this problem it is known to make the gears with larger gear teeth so that the gears are less sensitive to the radial displacements, but this has the disadvantage of increasing the inefficiency of the gearbox and increasing the tendency for scuffing. It is also known to make the carrier stiffer/stronger by increasing the mass of the carrier, but this mass has to be added at a large diameter region of the carrier which in turn generates further centrifugal loads and has the disadvantage of increasing the weight of the carrier, and/or increasing the diameter of the rim of the carrier, and hence increasing the weight of the geared gas turbine engine.

The present disclosure seeks to provide a geared gas turbine engine which reduces or overcomes this problem.

According to a first aspect of the present disclosure there is provided a gas turbine engine comprising a gearbox, the gearbox comprising a sun gear, an annulus gear, a plurality of planet gears and a carrier, the sun gear meshing with the planet gears and the planet gears meshing with the annulus gear, the carrier comprising a primary structure and at least one reinforcing structure, the primary structure comprising a first material and the at least one reinforcing structure comprising a second material, the primary structure comprising a first ring, a second ring spaced axially from the first ring and a plurality of circumferentially spaced axles extending axially between the first ring and the second ring, each planet gear being rotatably mounted on a respective one of the axles, the at least one reinforcing structure being secured to the primary structure, and the at least one reinforcing structure comprising a particulate reinforced material or a fibre reinforced material.

According to a second aspect of the disclosure there is provided a gearbox, the gearbox comprising a sun gear, an annulus gear, a plurality of planet gears and a carrier, the sun gear meshing with the planet gears and the planet gears meshing with the annulus gear, the carrier comprising a primary structure and at least one reinforcing structure, the primary structure comprising a first material and the at least one reinforcing structure comprising a second material, the primary structure comprising a first ring, a second ring spaced axially from the first ring and a plurality of circumferentially spaced axles extending axially between the first ring and the second ring, each planet gear being rotatably mounted on a respective one of the axles, the at least one reinforcing structure being secured to the primary structure, and the at least one reinforcing structure comprising a particulate reinforced material or a fibre reinforced material.

The first ring and the second ring may be secured together. The first ring and the second ring may be fastened, bolted, together.

The at least one reinforcing structure may be fastened, bonded, welded or brazed to the primary structure. The at least one reinforcing structure may be secured to the first ring or the second ring. A first reinforcing structure may be secured to the first ring and a second reinforcing structure may be secured to the second ring.

The first ring may comprise an annular plate or annular framework.

The second ring may comprise an annular plate or annular framework.

The annular plate may comprise a plurality of bosses and each boss is aligned with respective one of the axles. The annular framework may comprise a plurality of bosses, each boss is aligned with a respective one of the axles, and a radially inner annular member and a radially outer annular member interconnecting the bosses.

The primary structure may comprise an unreinforced material. The primary structure may comprise an alloy. The primary structure may comprise steel, titanium or a titanium alloy. The reinforcing structure may comprise a polymer matrix composite, a metal matrix composite or a ceramic matrix composite. The reinforcing structure may comprise a polymer matrix composite with long reinforcing fibres, a metal matrix composite with long reinforcing fibres or a ceramic matrix composite with long reinforcing fibres.

The first and second rings may have a plurality of circumferentially spaced bosses, each axle locating in a corresponding one of the bosses in the first ring and a corresponding one of the bosses in the second ring. The long reinforcing fibres may be arranged into at least one continuous loop arranged at a diameter greater than the diameter at which the bosses are arranged. The long reinforcing fibres may be arranged in a star shape. The long reinforcing fibres in the star shape may be wound partially around each boss of the first ring or the second ring. The long reinforcing fibres in the star shape may be wound fully around each boss of the first ring or the second ring. The reinforcing structure may comprise a polymer matrix composite with short reinforcing fibres, a metal matrix composite with short reinforcing fibres or a ceramic matrix composite with short reinforcing fibres. The reinforcing structure may comprise a polymer matrix composite with reinforcing particles, a metal matrix composite with reinforcing particles or a ceramic matrix composite with reinforcing particles.

The primary structure may comprise a particulate reinforced material. The primary structure may comprise a polymer matrix composite, a metal matrix composite or a ceramic matrix composite. The reinforcing structure may comprise a polymer matrix composite with long reinforcing fibres, a metal matrix composite with long reinforcing fibres or a ceramic matrix composite with long reinforcing fibres. The first and second rings may have a plurality of circumferentially spaced bosses, each axle locating in a corresponding one of the bosses in the first ring and a corresponding one of the bosses in the second ring. The long reinforcing fibres may be arranged into at least one continuous loop arranged at a diameter greater than the diameter at which the bosses are arranged. The long reinforcing fibres may be arranged in a star shape. The long reinforcing fibres in the star shape may be wound partially around each boss of the first ring or the second ring. The long reinforcing fibres in the star shape may be wound fully around each boss of the first ring or the second ring.

The polymer matrix composite may be reinforced with carbon fibres, aramid fibres, e.g. Kevlar® fibres, or boron fibres. The polymer matrix composite may comprise an unsaturated polyester matrix, an epoxide matrix, a vinyl ester matrix or a polyimide matrix. The metal matrix composite may be reinforced with silicon carbide fibres, silicon nitride fibres or boron nitride fibres. The metal matrix composite may comprise a steel matrix, a titanium matrix or a titanium alloy matrix. The ceramic matrix composite may be reinforced with silicon carbide fibres, silicon nitride fibres, alumina fibres, aluminosilicate fibres or mullite fibres. The ceramic matrix composite may comprise a silicon carbide matrix, a silicon nitride matrix, an alumina matrix, an aluminosilicate matrix or a mullite matrix.

Each planet gear may be rotatably mounted on the carrier by a journal bearing and/or at least one rolling element bearing.

Each planet gear may be rotatably mounted on the carrier by two rolling element bearings.

The carrier may be connected to an output shaft and the annulus gear is connected to a static structure.

The carrier may be connected to a static structure and the annulus gear is connected to an output shaft.

The carrier may be connected to an output shaft and the annulus gear is connected to an output shaft.

The gas turbine engine may comprise a propulsor, an intermediate-pressure compressor, a high-pressure compressor, a high-pressure turbine and a low-pressure turbine, the high-pressure turbine is arranged to directly drive the high-pressure compressor, the low-pressure turbine is arranged to directly drive the intermediate-pressure compressor and the low-pressure turbine is arranged to drive the propulsor via a gearbox.

The gas turbine engine may comprise a propulsor, an intermediate-pressure compressor, a high-pressure compressor, a high-pressure turbine and a low-pressure turbine, the high-pressure turbine is arranged to directly drive the high-pressure compressor, the low-pressure turbine is arranged to directly drive the propulsor and the low-pressure turbine is arranged to drive the intermediate-pressure compressor via a gearbox.

The gas turbine engine may comprise a propulsor, an intermediate-pressure compressor, a high-pressure compressor, a high-pressure turbine, an intermediate-pressure turbine and a low-pressure turbine, the high-pressure turbine is arranged to directly drive the high-pressure compressor, the intermediate-pressure turbine is arranged to directly drive the intermediate-pressure compressor and the low-pressure turbine is arranged to drive the propulsor via a gearbox.

The gas turbine engine may comprise a propulsor, a high-pressure compressor, a high-pressure turbine and a low-pressure turbine, the high-pressure turbine is arranged to directly drive the high-pressure compressor and the low-pressure turbine is arranged to drive the propulsor via a gearbox.

Alternatively, the gas turbine engine comprises a first propulsor, a second propulsor, an intermediate-pressure compressor, a high-pressure compressor, a high-pressure turbine, an intermediate-pressure turbine and a low-pressure turbine, the high-pressure turbine is arranged to directly drive the high-pressure compressor, the intermediate-pressure turbine is arranged to drive the intermediate-pressure compressor and the low-pressure turbine is arranged to drive the first propulsor and the second propulsor via a gearbox.

The sun gear may be driven by the low-pressure turbine, the annulus gear may be secured to static structure and the carrier may be arranged to drive the propulsor.

The sun gear may be driven by the low-pressure turbine, the carrier may be secured to static structure and the annulus gear may be arranged to drive the propulsor.

The carrier may be driven by the low-pressure turbine, the sun gear may be secured to static structure and the annulus gear may be arranged to drive a propulsor.

The sun gear may be driven by the low-pressure turbine, the carrier may be arranged to drive a first propulsor and the annulus gear may be arranged to drive a second propulsor.

The propulsor may be a fan or a propeller.

The sun gear, the planet gears and the annulus gear may each comprise two sets of helical gear teeth.

Alternatively, the sun gear, the planet gears and the annulus gear may each comprise one set of helical gear teeth.

The skilled person will appreciate that except where mutually exclusive, a feature described in relation to any one of the above aspects of the invention may be applied mutatis mutandis to any other aspect of the invention.

Embodiments of the disclosure will now be described by way of example only, with reference to the Figures, in which.

Figure 1:
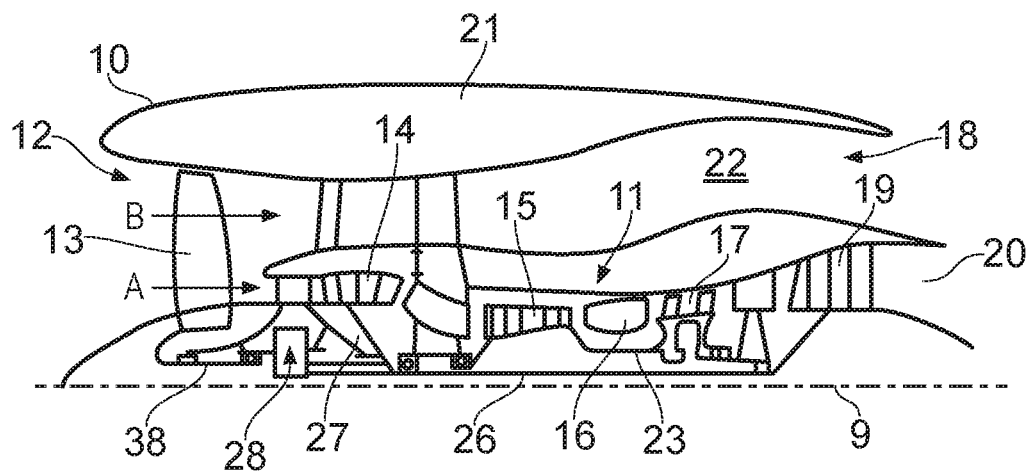
FIG. 1 is a part sectional side view of a geared turbofan gas turbine engine according to the present disclosure.
Figure 2:
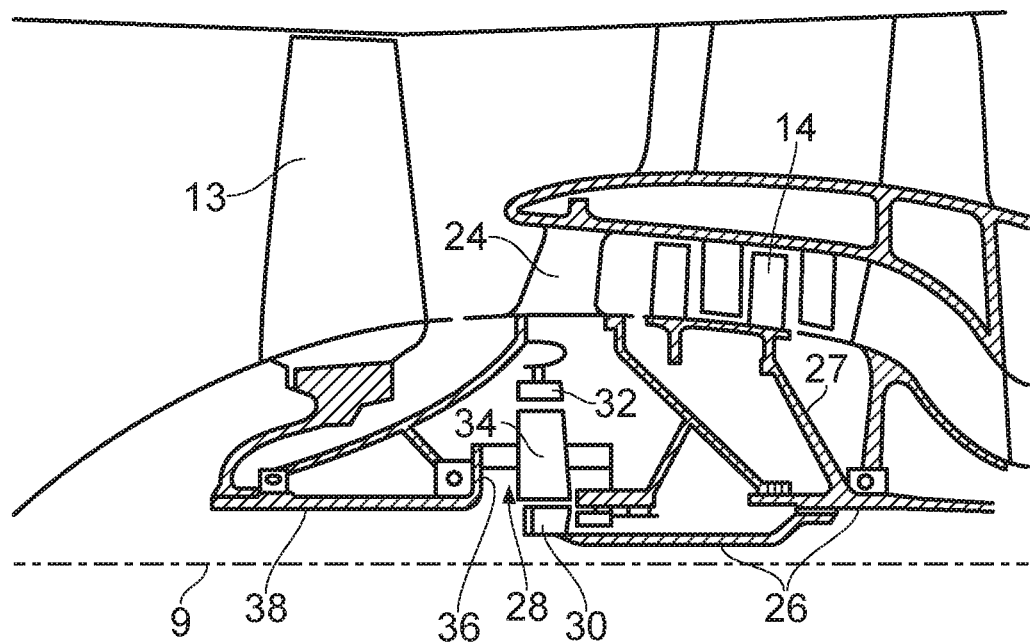
FIG. 2 is an enlarged part sectional side view of a portion of the geared turbofan gas turbine engine shown in FIG. 1.

With reference to FIGS. 1 and 2, a geared turbofan gas turbine engine is generally indicated at 10, having a principal and rotational axis 9. The engine 10 comprises, in axial flow series, an air intake 12, a propulsive fan 13, an intermediate-pressure, or booster, compressor 14, a high-pressure compressor 15, combustion equipment 16, a high-pressure turbine 17, a low-pressure turbine 19 and a core exhaust nozzle 20. The intermediate-pressure compressor 14, the high-pressure compressor 15, the combustion equipment 16, the high-pressure turbine 17 and the low-pressure turbine 19 form a core engine 11. A nacelle 21 generally surrounds the engine 10 and defines the intake 12, a bypass duct 22 and a bypass exhaust nozzle 18.

The gas turbine engine 10 works in the conventional manner so that air entering the intake 12 is compressed by the fan 13 to produce two air flows a first air flow A into the intermediate-pressure compressor 14 and a second air flow B which passes through the bypass duct 22 to provide the majority of the propulsive thrust. The intermediate-pressure compressor 14 compresses the air flow directed into it before delivering that air to the high-pressure compressor 15 where further compression takes place.

The compressed air exhausted from the high-pressure compressor 15 is directed into the combustion equipment 16 where it is mixed with fuel and the mixture combusted. The resultant hot combustion products then expand through, and thereby drive the high and low-pressure turbines 17, 19 before being exhausted through the core nozzle 20 to provide additional propulsive thrust. The high-pressure turbine 17 drives the high-pressure compressor 15 by a shaft 23. The low-pressure turbine 19 drives the intermediate-pressure compressor 14 directly via shafts 26 and 27. The low-pressure turbine 19 drives the fan 13 indirectly via the shaft 26, a gearbox 28 and a shaft 38. The gearbox 28 comprises a sun gear 30, an annulus gear 32, a plurality of planet gears 34 and a planet gear carrier 36. The sun gear 30 meshes with the planet gears 34 and the planet gears 34 mesh with the annulus gear 32. The planet gear carrier 36 constrains the planet gears 34 to precess around the sun gear 30 in synchronicity whilst enabling each planet gear 34 to rotate about its own axis independently. The planet gear carrier 36 is coupled via the shaft 38 to the fan 13 in order to drive its rotation about the engine axis 9. The annulus gear 32 is coupled to a static structure 24. The axes of the planet gears 34 and the axis of the planet gear carrier 36 are parallel to the engine axis 9. The shaft 38 is rotatably mounted in static structure by one or more bearings, e.g. rolling element bearings, e.g. roller bearings or ball bearings.

Figure 3:
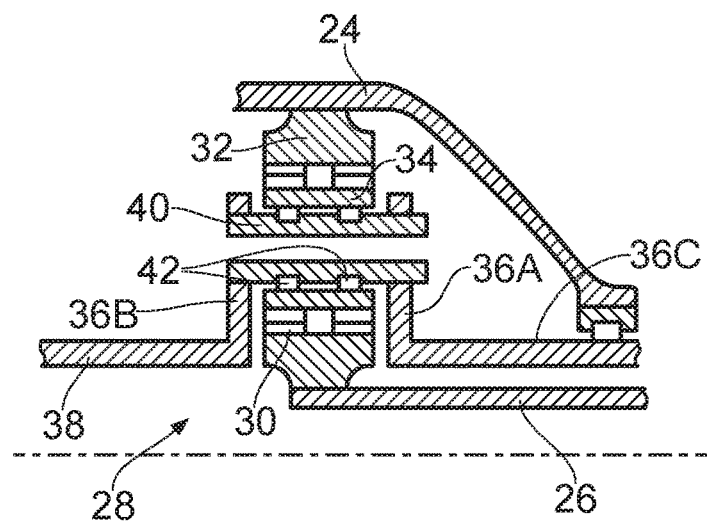
FIG. 3 is an enlarged cross-sectional view though the gearbox shown in FIG. 2.
Figure 4:
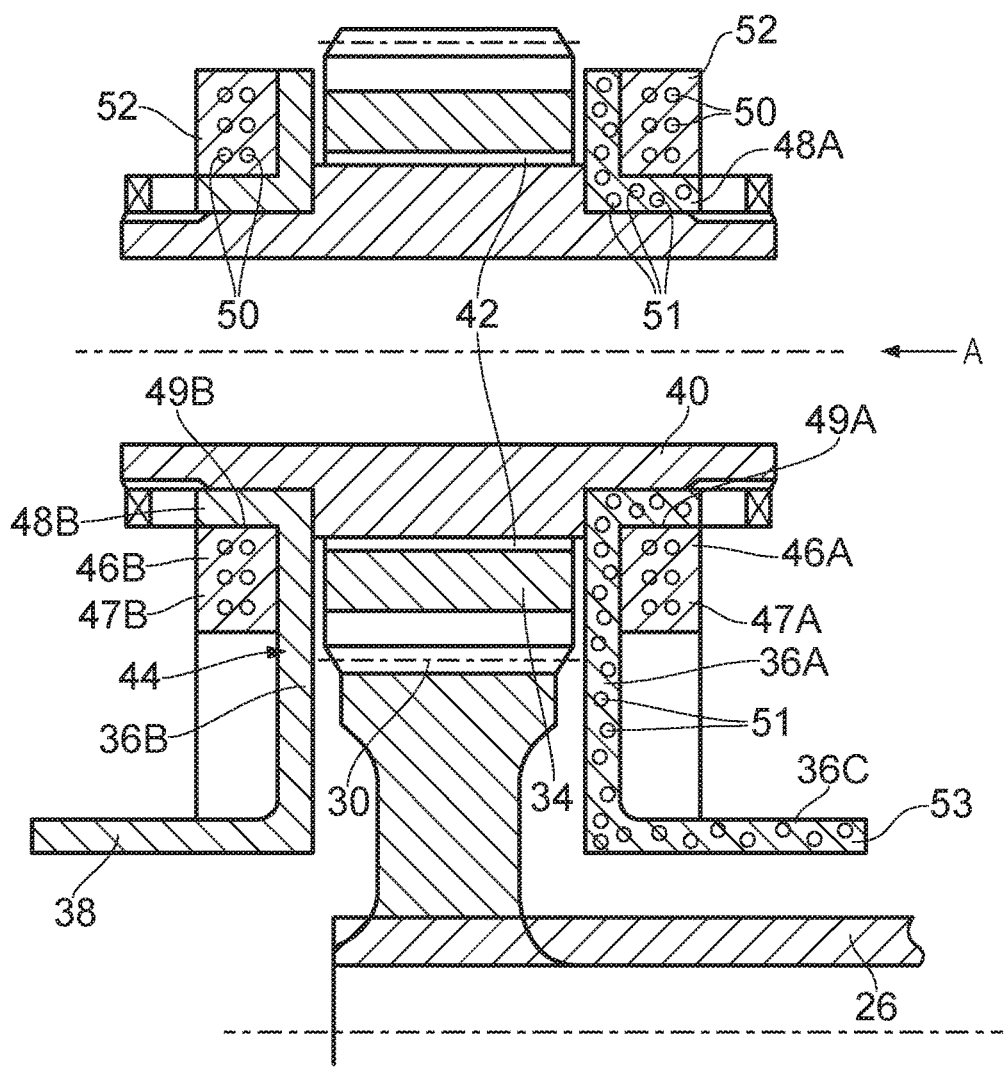
FIG. 4 is a further enlarged cross-sectional view of the gearbox shown in FIG. 3.
Figure 5:
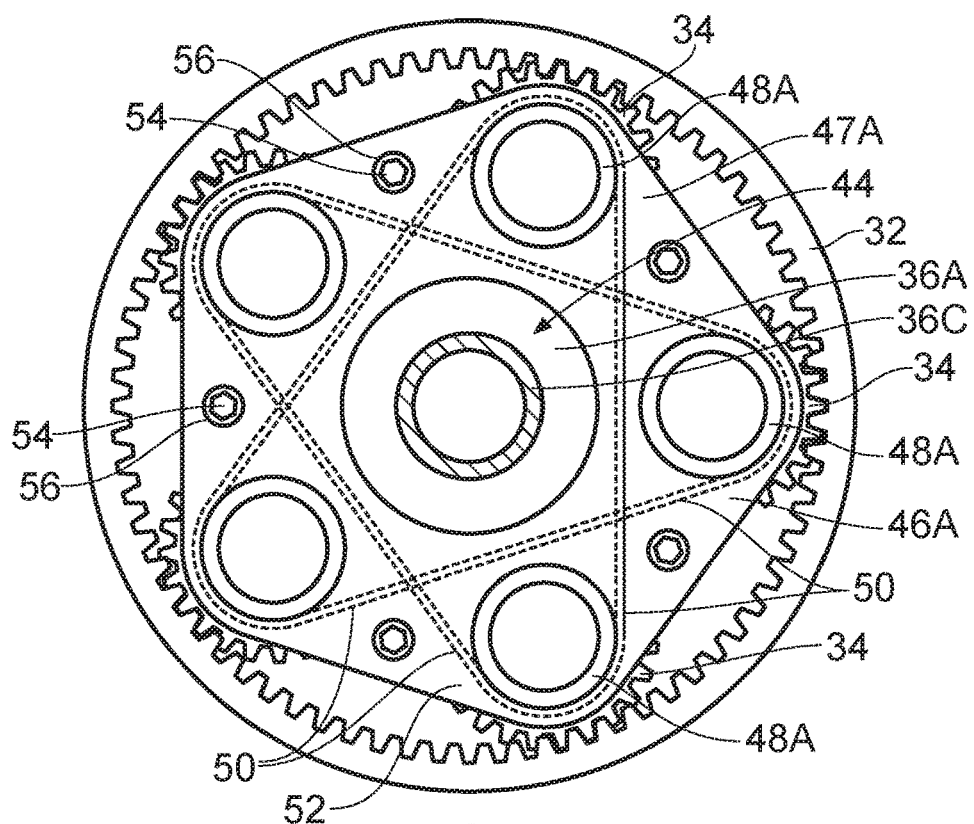
FIG. 5 is a view in the direction of Arrow A of the gearbox shown in FIG. 4.

The gearbox 28 is shown more clearly in FIGS. 3, 4 and 5 and the planet gear carrier 36 comprises a first ring 36A, a second ring 36B spaced axially from the first ring 36A, an extension shaft 36C and a plurality of circumferentially spaced axles 40 which extend axially between the first ring 36A and the second ring 363. The extension shaft 36C of the planet gear carrier 36 is rotatably mounted in the static structure 24 by a bearing 43. The axles 40 are also arranged parallel to the engine axis 9 and thus the axis of the gearbox 28. The axially spaced ends of each axle 40 are secured to the planet gear carrier 36, e.g. to the first ring 36A and the second ring 36B. The first and second rings 36A and 36B each have a plurality of circumferentially spaced bosses 48A and 48B, each axle 40 locates in an aperture extending through a corresponding one of the bosses 48A in the first ring 36A and in an aperture extending through a corresponding one of the bosses 48B in the second ring 36B. The first ring 36A and the second ring 36B are secured together. The first ring 36A and the second ring 36B may be fastened, e.g. bolted, together or welded, brazed or bonded together. In this arrangement each planet gear 36 is arranged around a respective one of the axles 40, each planet gear 34 is rotatably mounted in the planet gear earner 36 and in particular each planet gear 34 is rotatably mounted on a respective one of the axles 40 by a bearing arrangement 42. Each bearing arrangement 42 comprises a journal bearing or a rolling element bearing. In this particular arrangement each bearing arrangement 42 comprises two miler bearings. A lubrication system is arranged to supply lubricant to the planet gear bearing arrangements 42, the sun gear 30 and the planet gears 34.

The planet gear carrier 36 comprises a primary structure 44 and at least one reinforcing structure 46, as shown more clearly in FIGS. 4 and 5. The primary structure 44 comprises a first material and the at least one reinforcing structure 46 comprises a second material. The primary structure 44 comprises the first ring 36A, the second ring 36B spaced axially from the first ring 36A and the plurality of circumferentially spaced axles 40 extending axially between the first ring 36A and the second ring 36B. The primary structure 44 may also comprise the extension shaft 36C. The at least one reinforcing structure 46 is secured to the primary structure 44. The primary structure 44 comprises an unreinforced material or a particulate reinforced material and the at least one reinforcing structure 46 comprises a reinforced material.

The at least one reinforcing structure 46 is fastened, bonded, welded or brazed to the primary structure 44. The at least one reinforcing structure 46 is secured to the first ring 36A or the second ring 36B, in this particular arrangement the reinforcing structure 46 comprise a first reinforcing structure 46A secured to the first ring 36A and a second reinforcing structure 46B secured to the second ring 36B.

The first ring 36A comprises an annular plate or annular framework and the second ring 36B comprises an annular plate or annular framework. Each of the annular plates is defined by circular radially inner and radially outer peripheries, by polygonal radially inner and outer peripheries, by a circular radially inner periphery and a polygonal radially outer periphery or a polygonal radially inner periphery and a circular radially outer periphery. Each of the annular plates has the plurality of circumferentially spaced bosses 48A and 48B respectively. Each of the annular frameworks comprises at least a radially inner annular member, a radially outer annular member and the plurality of circumferentially spaced bosses 48A and 48B respectively. The bosses 48A and 48B interconnect the radially inner annular member and the radially outer annular member. The radially inner annular member may be circular or polygonal and the radially outer annular member may be circular or polygonal. Each annular framework may comprise additional radially or radially and circumferentially extending members interconnecting the radially inner annular member and the radially outer annular member to increase the stiffness.

The first reinforcing structure 46A and the second reinforcing structure 46B each comprise an annular member 47A and 47B respectively and each of the annular members 47A and 47B is defined by circular radially inner and radially outer peripheries, by polygonal radially inner and outer peripheries, by a circular radially inner periphery and a polygonal radially outer periphery or a polygonal radially inner periphery and a circular radially outer periphery. Each of the annular members 47A and 47B has a plurality of circumferentially spaced apertures 49A and 49B respectively dimensioned to locate on the bosses 48A and 48B of the first and second rings 36A and 36B respectively.

In one arrangement the primary structure 44 comprise an unreinforced material and the reinforcing structure 46 comprises a fibre reinforced material or a particulate reinforced material. The primary structure 44 comprises a metal and the metal may be an alloy, for example the primary structure may comprise steel, titanium, a titanium alloy, aluminium, an aluminium alloy, nickel or a nickel alloy. The reinforcing structure 46 comprises a polymer matrix composite, a metal matrix composite or a ceramic matrix composite. The reinforcing structure 46 may comprise a polymer matrix composite with long reinforcing fibres, a metal matrix composite with long reinforcing fibres or a ceramic matrix composite with long reinforcing fibres. Alternatively, the reinforcing structure 46 comprises a polymer matrix composite with short reinforcing fibres, a metal matrix composite with short reinforcing fibres or a ceramic matrix composite with short reinforcing fibres. In a further alternative, the reinforcing structure 46 comprises a polymer matrix composite with reinforcing particles, a metal matrix composite with reinforcing particles or a ceramic matrix composite with reinforcing particles.

In another arrangement the primary structure 44 comprises a particulate reinforced material and the reinforcing structure 46 comprises a fibre reinforced material or a particulate reinforced material. The primary structure 44 comprises a polymer matrix composite, a metal matrix composite or a ceramic matrix composite. The reinforcing structure 46 comprises a polymer matrix composite, a metal matrix composite or a ceramic matrix composite. The reinforcing structure 46 may comprise a polymer matrix composite with long reinforcing fibres, a metal matrix composite with long reinforcing fibres or a ceramic matrix composite with long reinforcing fibres. Alternatively, the reinforcing structure 46 comprises a polymer matrix composite with short reinforcing fibres, a metal matrix composite with short reinforcing fibres or a ceramic matrix composite with short reinforcing fibres. In a further alternative, the reinforcing structure 46 comprises a polymer matrix composite with reinforcing particles, a metal matrix composite with reinforcing particles or a ceramic matrix composite with reinforcing particles.

FIGS. 4 and 5 show an arrangement in which the first ring 36A of the primary structure 44 comprises a particulate reinforced material and the second ring 36B of the primary structure 44 comprises a metal. The first ring 36A of the primary structure 44 comprises reinforcing particles 51 in a matrix material 53. The first ring 36A of the primary structure 44 comprises a polymer matrix composite, a metal matrix composite or a ceramic matrix composite and the metal of the second ring 36B of the primary structure 44 may be an alloy, for example steel, titanium, a titanium alloy, aluminium, an aluminium alloy, nickel or a nickel alloy. The reinforcing structures 46A and 46B comprise a polymer matrix composite, a metal matrix composite or a ceramic matrix composite. The reinforcing structures 46A and 46B comprise a polymer matrix composite with long reinforcing fibres, a metal matrix composite with long reinforcing fibres or a ceramic matrix composite with long reinforcing fibres. The reinforcing structures 46A and 46B comprise long reinforcing fibres 50 in a matrix material 52. The long reinforcing fibres 50 are arranged in a star shape in both of the reinforcing structures 46A and 46B. The long reinforcing fibres 50 in the star shape are wound partially around each aperture 49A of the first reinforcing structure 46A and the long reinforcing fibres 50 in the star shape are wound partially around each aperture 49B of the second reinforcing structure 46B. The long reinforcing fibres 50 in the star shape are thus wound partially around each boss 48A of the first ring 36A and the long reinforcing fibres 50 in the star shape are wound partially around each boss 48B of the second ring 36B. The long reinforcing fibres 50 in the star shape in the first reinforcing structure 46A are thus wound partially around a first end of each axle 40 and the long reinforcing fibres 50 in the star shape in the second reinforcing structure 46B are wound partially around a second end of each axle 40. The long reinforcing fibres 50 are wound around circumferentially alternate apertures 49A or 49B between the apertures 49A or 49B and the radially outer periphery of the annular member 47A or 47B and passing between the circumferentially adjacent aperture 49A or 49B and the radially inner periphery of the annular member 47A or 47B. A plurality of axially extending bolts 54, washers 56 and nuts (not shown) are used to secure the first and second reinforcing structures 46A and 46B to the first and second rings 36a and 36B of the primary structure 44.

Figure 6:
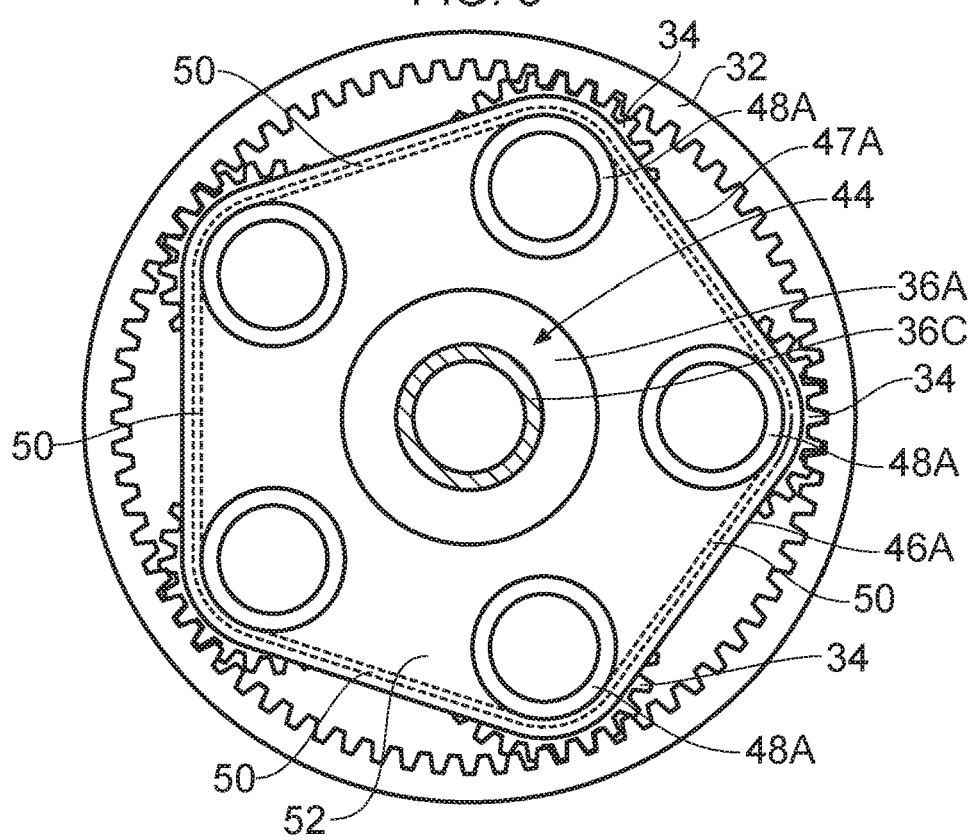
FIG. 6 is an alternative view in the direction of Arrow A of the gearbox shown in FIG. 4.

FIG. 6 shows an arrangement similar to that shown in FIGS. 4 and 5 but the long reinforcing fibres 50 are wound into at least one continuous loop between the apertures 49A and the radially outer periphery of the annular member 47A of the first reinforcing structure 46A and the long reinforcing fibres 50 are wound into at least one continuous loop between the apertures 49B and the radially outer periphery of the annular member 47B of the second reinforcing structure 46B. Thus, the long reinforcing fibres 50 are arranged into at least one continuous loop arranged at a diameter greater than the diameter at which the bosses 48A or 48B are arranged. The long reinforcing fibres 50 of the first reinforcing structure 46A are wound into at least one continuous loop between a first end of each axle 40 and the radially outer periphery of the first reinforcing structure 46A and the long reinforcing fibres 50 are wound into at least one continuous loop between the second end of each axle 40 and the radially outer periphery of the second reinforcing structure 46B.

Figure 7:
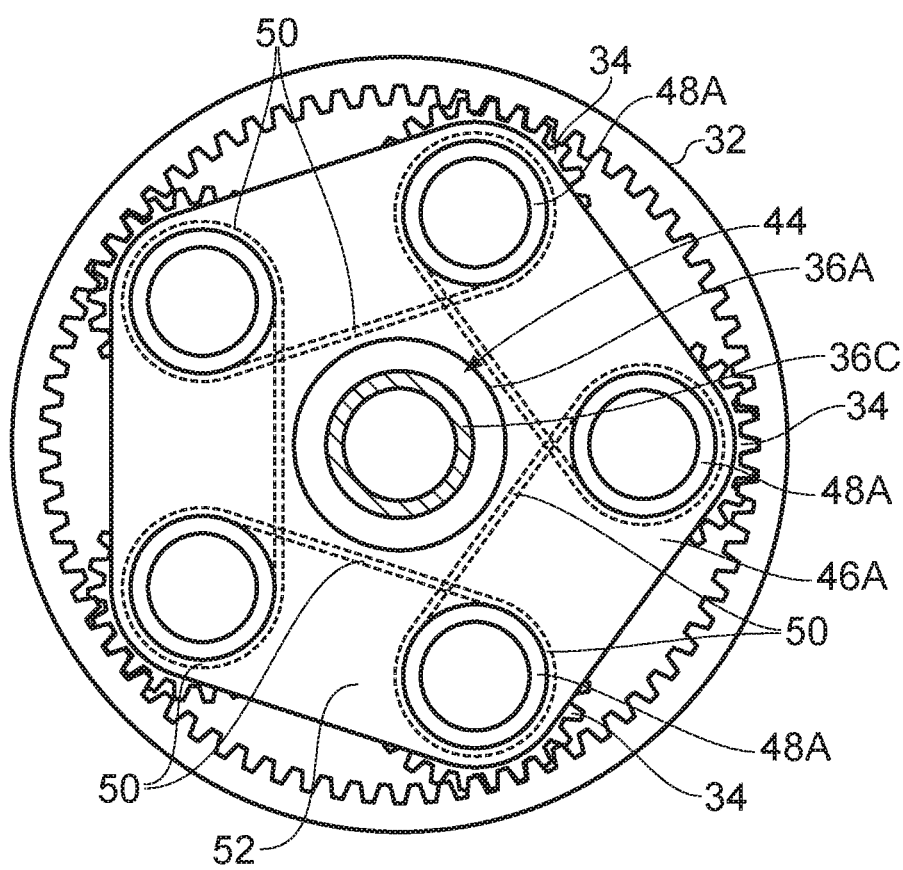
FIG. 7 is a further alternative view in the direction of Arrow A of the gearbox shown in FIG. 4.

FIG. 7 shows an arrangement similar to that shown in FIGS. 4 and 5 but the long reinforcing fibres 50 in the star shape are wound fully around each aperture 49A of the annular member 47A of the first reinforcing structure 46A and the long reinforcing fibres 50 in the star shape are wound fully around each aperture 49B of the annular member 47B of the second reinforcing structure 46B. The long reinforcing fibres 50 are wound fully around each aperture 49A of the annular member 47A in turn and the long reinforcing fibres 50 are wound fully around each aperture 49B of the annular member 47B in turn. Thus, long reinforcing fibres 50 in the star shape are wound fully around each boss 48A or 48B of the first ring 36A or the second ring 36B. The long reinforcing fibres 50 in the star shape in the first reinforcing structure 46A are thus wound fully around a first end of each axle 40 and the long reinforcing fibres 50 in the star shape in the second reinforcing structure 46B are wound fully around a second end of each axle 40.

The polymer matrix composite may be reinforced with carbon fibres or boron fibres. The polymer matrix composite may comprise an unsaturated polyester matrix an epoxide matrix, a vinyl ester matrix or a polyamide matrix. The metal matrix composite may be reinforced with silicon carbide fibres, silicon nitride fibres or boron nitride fibres. The metal matrix composite may comprise an iron matrix, a steel matrix, a titanium matrix, a titanium alloy matrix, an aluminium matrix, an aluminium alloy matrix, a nickel matrix or a nickel alloy matrix. The ceramic matrix composite may be reinforced with silicon carbide fibres, silicon nitride fibres, alumina fibres, aluminosilicate fibres or mullite fibres. The ceramic matrix composite may comprise a silicon carbide matrix, a silicon nitride matrix, an alumina matrix, an aluminosilicate matrix or a mullite matrix.

Each reinforcing structure with long reinforcing fibres may be made by making a fibre preform and then depositing a matrix material on and around the fibre preform. If the matrix material is a polymer, polymer matrix may be deposited onto the reinforcing fibres for example using resin transfer moulding. If the matrix material is a metal, the metal matrix may be deposited onto the reinforcing fibres using for example vapour deposition, e.g. physical vapour deposition, by thermal spraying or plasma spraying. If the matrix material is a ceramic matrix, the ceramic matrix may be deposited onto the reinforcing fibres by for example vapour deposition, e.g. chemical vapour deposition, or by applying a slurry.

In a first example the primary structure comprises titanium and the reinforcing structure comprises a titanium matrix composite with silicon carbide reinforcing fibres. In a second example the primary structure comprises steel and the reinforcing structure comprises a titanium matrix composite with silicon carbide reinforcing fibres. In a third example the primary structure comprises titanium and the reinforcing structure comprises an iron matrix composite with silicon carbide reinforcing fibres. In a fourth example the primary structure comprises steel and the reinforcing structure comprises an iron matrix composite with silicon carbide reinforcing fibres. In a fifth example the primary structure comprises titanium and the reinforcing structure comprises a steel matrix composite with silicon carbide reinforcing fibres and in a sixth example the primary structure comprises steel and the reinforcing structure comprises a steel matrix composite with silicon carbide reinforcing fibres. In each of these examples the silicon carbide fibres may be replaced with silicon nitride fibres, titanium diboride fibres or boron nitride fibres.

In a seventh example the primary structure comprises titanium with particulate reinforcement and the reinforcing structure comprises a titanium matrix composite with silicon carbide reinforcing fibres. In an eighth example the primary structure comprises steel with particulate reinforcement and the reinforcing structure comprises a titanium matrix composite with silicon carbide reinforcing fibres. In a ninth example the primary structure comprises titanium with particulate reinforcement and the reinforcing structure comprises an iron matrix composite with silicon carbide reinforcing fibres. In a tenth example the primary structure comprises steel with particulate reinforcement and the reinforcing structure comprises an iron matrix composite with silicon carbide reinforcing fibres. In an eleventh example the primary structure comprises titanium with particulate reinforcement and the reinforcing structure comprises a steel matrix composite with silicon carbide reinforcing fibres and in a twelfth example the primary structure comprises steel with particulate reinforcement and the reinforcing structure comprises a steel matrix composite with silicon carbide reinforcing fibres. In each of these examples the silicon carbide fibres may be replaced with silicon nitride fibres, titanium diboride fibres or boron nitride fibres.

The first and second reinforcing structures 46A and 46B may be welded, brazed or bonded to the first and second rings 36*a* and 36B of the primary structure 44 if they comprise similar materials, e.g. both comprise a metal. The first and second reinforcing structures 46A and 46B may be fastened, e.g. bolted, to the first and second rings 36*a* and 36B of the primary structure 44 if they comprise different or similar materials, e.g. one material comprises a metal and the other material comprises a ceramic or a polymer, one material comprises a ceramic and the other comprises a polymer, both materials comprise a metal, both materials comprise a polymer or both materials comprise a ceramic.

The reinforcing structures with long reinforcing fibres have the reinforcing fibres aligned, or arranged, to carry the loads acting on the planet gear carrier and produce a stiffer structure. The short reinforcing fibres and the reinforcing particles are randomly distributed and are not aligned, or arranged, in the same manner as the long reinforcing fibres and therefore produce a structure with less stiffness than the long reinforcing fibres.

The advantage of the present disclosure is that it enables the primary structure of the planet gear carrier to be made as small and lightweight as is practical while providing positioning of the planet gears. The reinforcing structures of the planet gear carrier are optimised to provide a stiff lightweight reinforcement for the primary structure so that the primary structure of the planet gear carrier is able to support the loads applied to the planet gears and planet gear bearings, which are generated by torque or centrifugally generated. A planet gear carrier comprising a primary structure and a reinforcing structure is also able to maintain the positions of the gears very accurately to maintain adequate gear performance in terms of controlling the tooth loading and the noise, or vibration, levels. The weight of the planet gear carrier is significantly reduced. Alternatively, a planet gear carrier comprising a primary structure and a reinforcing structure may be designed to have increased stiffness such that smaller, more efficient teeth may be provided on the sun gear, planet gears and annulus gear.

Figure 8:
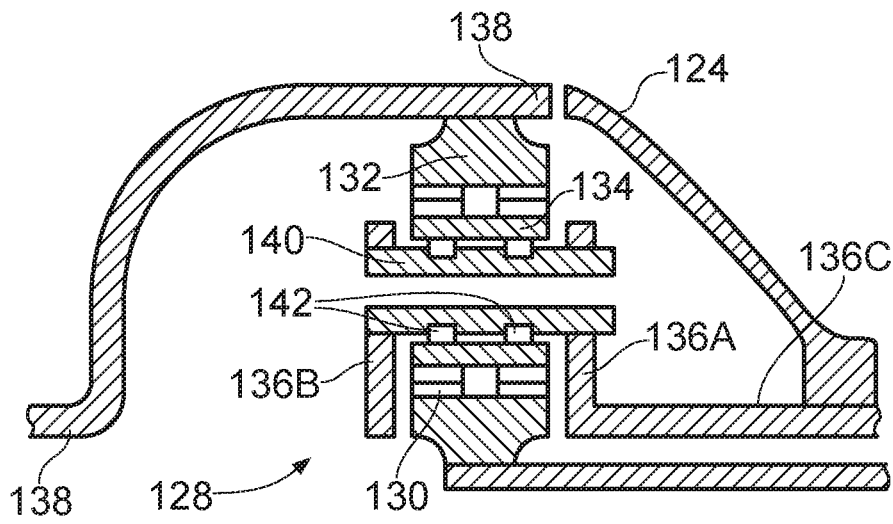
FIG. 8 is an alternative enlarged cross-sectional view though the gearbox shown in FIG. 2.

FIG. 8 shows an arrangement in which the low-pressure turbine 19 drives the fan 13 indirectly via the shaft 126, a gearbox 128 and a shaft 138. The gearbox 128 comprises a sun gear 130, an annulus gear 132, a plurality of planet gears 134 and a planet gear carrier 136. The sun gear 130 meshes with the planet gears 134 and the planet gears 134 mesh with the annulus gear 132. The planet gear carrier 136 enabling each planet gear 134 to rotate about its own axis independently. The planet gear carrier 136 is coupled to a static structure 124. The annulus gear 132 is coupled via the shaft 138 to the fan 13 in order to drive its rotation about the engine axis 9. The axes of the planet gears 134 are parallel to the engine axis 9. The planet gear carrier 136 comprises a first ring 136A, a second ring 136B spaced axially from the first ring 136A and a plurality of circumferentially spaced axles 140 which extend axially between the first ring 136A and the second ring 136B. Each planet gear 134 is rotatably mounted on a respective one of the axles 140 and an annular extension 136C extends axially from the first ring 136A. Each planet gear 134 is rotatably mounted in the planet gear carrier 136 by at least one planet gear bearing 142. The annular extension 136C is secured to the static structure 124. In this particular embodiment each planet gear 134 is rotatably mounted on the planet gear carrier 136 by two roller bearings 142. Alternatively each planet gear 134 may be rotatably mounted on the planet gear carrier 136 by a journal bearing. A lubrication system is arranged to supply lubricant to the planet gear bearings 142, the sun gear 130 and the planet gears 134. The gearbox arrangement 128 of FIG. 8 may be provided with a planet gear carrier 136 with a primary structure 44 and reinforcing structure 46 as described with reference to FIGS. 4 and 5, FIGS. 4 and 6 or FIGS. 4 and 7.

Figure 9:
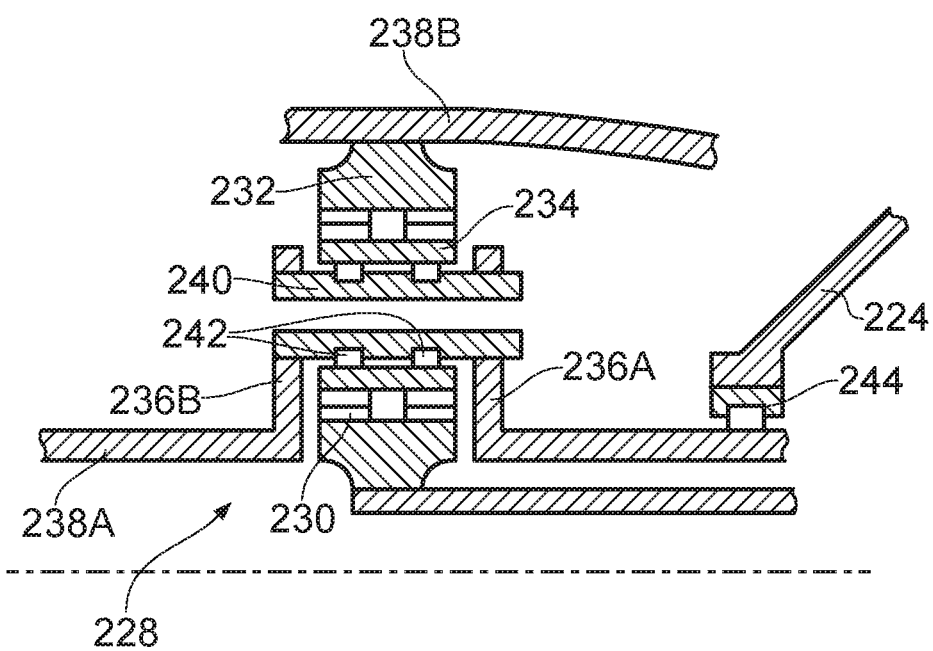
FIG. 9 is a further alternative enlarged cross-sectional view though the gearbox shown in FIG. 2.

FIG. 9 shows an arrangement in which the low-pressure turbine 19 drives two fans indirectly via the shaft 226, a gearbox 228 and shaft 238A and 238B. The gearbox 228 comprises a sun gear 230, an annulus gear 232, a plurality of planet gears 234 and a planet gear carrier 236. The sun gear 230 meshes with the planet gears 234 and the planet gears 234 mesh with the annulus gear 232. The planet gear carrier 236 enabling each planet gear 234 to rotate about its own axis independently. The planet gear carrier 236 is coupled via the shaft 238A to a first propulsor (not shown) and the annulus gear 232 is coupled via the shaft 238B to a second propulsor (not shown) in order to drive their rotation about the engine axis 9. The propulsors are driven to rotate in opposite rotational directions. The axes of the planet gears 234 are parallel to the engine axis 9. The planet gear carrier 236 comprises a first ring 236A, a second ring 236B spaced axially from the first ring 236A and a plurality of circumferentially spaced axles 240 which extend axially between the first ring 236A and the second ring 236B. Each planet gear 234 is rotatably mounted on a respective one of the axles 240 and an annular extension 236C extends axially from the first ring 236A. Each planet gear 234 is rotatably mounted in the planet gear carrier 236 by at least one planet gear bearing 242. The annular extension 236C is rotatably mounted in the static structure 224 by a bearing 244. In this particular embodiment each planet gear 234 is rotatably mounted on the planet gear carrier 236 by two roller bearings 242. Alternatively each planet gear 234 may be rotatably mounted on the planet gear carrier 236 by a journal bearing. A lubrication system 246 is arranged to supply lubricant to the planet gear bearings 242, the sun gear 230 and the planet gears 234. The gearbox arrangement 228 of FIG. 9 may be provided with a planet gear carrier 236 with a primary structure 44 and reinforcing structure 46 as described with reference to FIGS. 4 and 5, FIGS. 4 and 6 or FIGS. 4 and 7.

In each of the arrangements described above the sun gear, the annulus gear, the carrier and the shaft are coaxial.

In each of the arrangements described above the lubricant, e.g. oil, lubricates and cools the sun, annulus and planet gears and the bearings of the planet gears.

As described above, the gas turbine engine comprises a propulsor, an intermediate-pressure compressor, a high-pressure compressor, a high-pressure turbine and a low-pressure turbine, the high-pressure turbine is arranged to directly drive the high-pressure compressor, the low-pressure turbine is arranged to directly drive the intermediate-pressure compressor and the low-pressure turbine is arranged to drive the propulsor via a gearbox.

Alternatively, the gas turbine engine comprises a propulsor, an intermediate-pressure compressor, a high-pressure compressor, a high-pressure turbine and a low-pressure turbine, the high-pressure turbine is arranged to directly drive the high-pressure compressor, the low-pressure turbine is arranged to directly drive the propulsor and the low-pressure turbine is arranged to drive the intermediate-pressure compressor via a gearbox.

Alternatively, the gas turbine engine comprises a propulsor, an intermediate-pressure compressor, a high-pressure compressor, a high-pressure turbine, an intermediate-pressure turbine and a low-pressure turbine, the high-pressure turbine is arranged to directly drive the high-pressure compressor, the intermediate-pressure turbine is arranged to directly drive the intermediate-pressure compressor and the low-pressure turbine is arranged to drive the propulsor via a gearbox.

Alternatively the gas turbine engine may comprise a propulsor, a high-pressure compressor, a high-pressure turbine and a low-pressure turbine, the high-pressure turbine is arranged to directly drive the high-pressure compressor and the low-pressure turbine is arranged to drive the propulsor via a gearbox.

Alternatively, the gas turbine engine comprises a first propulsor, a second propulsor, an intermediate-pressure compressor, a high-pressure compressor, a high-pressure turbine, an intermediate-pressure turbine and a low-pressure turbine, the high-pressure turbine is arranged to directly drive the high-pressure compressor, the intermediate-pressure turbine is arranged to directly drive the intermediate-pressure compressor and the low-pressure turbine is arranged to drive the first propulsor and the second propulsor via a gearbox.

Alternatively, the gas turbine engine comprises a first propulsor, a second propulsor, a low-pressure compressor, a high-pressure compressor, a high-pressure turbine, a low-pressure turbine and a free power turbine, the high-pressure turbine is arranged to directly drive the high-pressure compressor, the low-pressure turbine is arranged to directly drive the low-pressure compressor and the free power turbine is arranged to drive the first propulsor and the second propulsor via a gearbox.

Alternatively, the gas turbine engine comprises a first propulsor, a second propulsor, a low-pressure compressor, a high-pressure compressor, a high-pressure turbine and a low-pressure turbine, the high-pressure turbine is arranged to directly drive the high-pressure compressor, the low-pressure turbine is arranged to directly drive the low-pressure compressor and the low-pressure turbine is arranged to drive the first propulsor and the second propulsor via a gearbox.

The sun gear may be driven by a low-pressure turbine, the annulus gear may be secured to static structure and the carrier may be arranged to drive a propulsor.

The sun gear may be driven by the low-pressure turbine, the carrier may be secured to static structure and the annulus gear may be arranged to drive a propulsor. In this arrangement each planet gear rotates about its own axis and the carrier does not rotate about the engine axis. The axes of the planet gears are parallel to the engine axis.

The carrier may be driven by the low-pressure turbine, the sun gear may be secured to static structure and the annulus gear may be arranged to drive a propulsor.

The sun gear may be driven by the low-pressure turbine, the carrier may be arranged to drive a first propulsor and the annulus gear may be arranged to drive a second propulsor.

Although the present disclosure has been described with reference to planetary gearbox, star gearbox and differential gearbox arrangements it is equally possible for the gearbox to be arranged in a solar gearbox arrangement, e.g. the sun gear is secured to static structure and either the carrier is driven by an input drive shaft and the annulus gear drives an output drive shaft or the annulus gear is driven by an input drive shaft and the carrier drives an output drive shaft. The propulsor may be a fan or a propeller.

It will be understood that the invention is not limited to the embodiments above-described and various modifications and improvements can be made without departing from the concepts described herein. Except where mutually exclusive, any of the features may be employed separately or in combination with any other features and the disclosure extends to and includes all combinations and sub-combinations of one or more features described herein.

The invention claimed is:

1. A gas turbine engine comprising a gearbox, the gearbox comprising a sun gear, an annulus gear, a plurality of planet gears and a carrier, the sun gear meshing with the planet gears and the planet gears meshing with the annulus gear, the carrier comprising a primary structure and at least one reinforcing structure, the primary structure comprising a first material and the at least one reinforcing structure comprising a second material, the primary structure comprising a first ring, a second ring spaced axially from the first ring and a plurality of circumferentially spaced axles extending axially between the first ring and the second ring, each planet gear being rotatably mounted on a respective one of the axles, the at least one reinforcing structure being secured to the primary structure, a first reinforcing structure of the at least one reinforcing structure being secured to the first ring, a second reinforcing structure of the at least one reinforcing structure being secured to the second ring, the first reinforcing structure and the second reinforcing structure each comprising an annular member, and the at least one reinforcing structure comprising a reinforced material, the reinforced material being selected from a group consisting essentially of a particulate reinforced material and a fiber reinforced material,
wherein the reinforced material is selected from a group consisting essentially of a polymer matrix composite with long reinforcing fibers, a metal matrix composite with long reinforcing fibers and a ceramic matrix composite with long reinforcing fibers,
wherein the first and second rings have a plurality of circumferentially spaced bosses, each axle locating in a corresponding one of the bosses in the first ring and a corresponding one of the bosses in the second ring, and
wherein the long reinforcing fibers are arranged in a star shape, the long reinforcing fibers in the star shape are wound partially around each boss of the first ring.

2. A gas turbine engine as claimed in claim 1 wherein the first ring is selected from a group consisting essentially of an annular plate and an annular framework.

3. A gas turbine engine as claimed in claim 1 wherein the second ring is selected from a group consisting essentially of an annular plate and an annular framework.

4. A gas turbine engine as claimed in claim 1 wherein the primary structure comprises an unreinforced material.

5. A gas turbine engine as claimed in claim 4 wherein the primary structure comprises a metal selected from a group consisting essentially of steel, titanium, a titanium alloy, nickel, a nickel alloy, aluminum and an aluminum alloy.

6. A gas turbine engine as claimed in claim 1 wherein the primary structure comprises a particulate reinforced material.

7. A gas turbine engine as claimed in claim 6 wherein the particulate reinforced material of the primary structure is selected from a group consisting essentially of a polymer matrix composite, a metal matrix composite and a ceramic matrix composite.

8. A gas turbine engine as claimed in claim 1 wherein the first and second reinforcing structures are coaxial with the planet gear carrier.

9. A gas turbine engine as claimed in claim 1 wherein the first and second reinforcing structures each have a plurality of circumferentially spaced apertures.

10. A gearbox, the gearbox comprising a sun gear, an annulus gear, a plurality of planet gears and a carrier, the sun gear meshing with the planet gears and the planet gears meshing with the annulus gear, the carrier comprising a primary structure and at least one reinforcing structure, the primary structure comprising a first material and the at least one reinforcing structure comprising a second material, the primary structure comprising a first ring, a second ring spaced axially from the first ring and a plurality of circumferentially spaced axles extending axially between the first ring and the second ring, each planet gear being rotatably mounted on a respective one of the axles, the at least one reinforcing structure being secured to the primary structure, and the at least one reinforcing structure comprising a reinforced material, the reinforced material being selected from a group consisting essentially of a particulate reinforced material and a fiber reinforced material, a first reinforcing structure of the at least one reinforcing structure being secured to the first ring, a second reinforcing structure of the at least one reinforcing structure being secured to the second ring, the first reinforcing structure and the second reinforcing structure each comprising an annular member,
wherein the reinforced material is selected from a group consisting essentially of a polymer matrix composite with long reinforcing fibers, a metal matrix composite with long reinforcing fibers and a ceramic matrix composite with long reinforcing fibers,
wherein the first and second rings have a plurality of circumferentially spaced bosses, each axle locating in a corresponding one of the bosses in the first ring and a corresponding one of the bosses in the second ring, and
wherein the long reinforcing fibers are arranged in a star shape, the long reinforcing fibers in the star shape are wound partially around each boss of the first ring.

11. A gas turbine engine comprising a gearbox, the gearbox comprising a sun gear, an annulus gear, a plurality of planet gears and a carrier, the sun gear meshing with the planet gears and the planet gears meshing with the annulus gear, the carrier comprising a primary structure and at least one reinforcing structure, the primary structure comprising a first material and the at least one reinforcing structure comprising a second material, the primary structure comprising a first ring, a second ring spaced axially from the first ring and a plurality of circumferentially spaced axles extending axially between the first ring and the second ring, each planet gear being rotatably mounted on a respective one of the axles, the at least one reinforcing structure being secured to the primary structure, a first reinforcing structure of the at least one reinforcing structure being secured to the first ring, a second reinforcing structure of the at least one reinforcing structure being secured to the second ring, the first reinforcing structure and the second reinforcing structure each comprising an annular member, and the at least one reinforcing structure comprising a reinforced material, the reinforced material being selected from a group consisting essentially of a particulate reinforced material and a fiber reinforced material,
wherein the reinforced material is selected from a group consisting essentially of a polymer matrix composite with long reinforcing fibers, a metal matrix composite with long reinforcing fibers and a ceramic matrix composite with long reinforcing fibers,
wherein the first and second rings have a plurality of circumferentially spaced bosses, each axle locating in a corresponding one of the bosses in the first ring and a corresponding one of the bosses in the second ring, and
wherein the long reinforcing fibers are arranged into at least one continuous loop arranged at a diameter greater than the diameter at which the bosses are arranged.

12. A gas turbine engine comprising a gearbox, the gearbox comprising a sun gear, an annulus gear, a plurality of planet gears and a carrier, the sun gear meshing with the planet gears and the planet gears meshing with the annulus gear, the carrier comprising a primary structure and at least one reinforcing structure, the primary structure comprising a first material and the at least one reinforcing structure comprising a second material, the primary structure comprising a first ring, a second ring spaced axially from the first ring and a plurality of circumferentially spaced axles extending axially between the first ring and the second ring, each planet gear being rotatably mounted on a respective one of the axles, the at least one reinforcing structure being secured to the primary structure, a first reinforcing structure of the at least one reinforcing structure being secured to the first ring, a second reinforcing structure of the at least one reinforcing structure being secured to the second ring, the first reinforcing structure and the second reinforcing structure each comprising an annular member, and the at least one reinforcing structure comprising a reinforced material, the reinforced material being selected from a group consisting essentially of a particulate reinforced material and a fiber reinforced material, wherein the reinforced material is selected from a group consisting essentially of a polymer matrix composite with long reinforcing fibers, a metal matrix composite with long reinforcing fibers and a ceramic matrix composite with long reinforcing fibers, wherein the first and second rings have a plurality of circumferentially spaced bosses, each axle locating in a corresponding one of the bosses in the first ring and a corresponding one of the bosses in the second ring, and wherein the long reinforcing fibers are arranged in a star shape, the long reinforcing fibers in the star shape are wound fully around each boss of the first ring.

* * * * *